(12) United States Patent
Roberge (10) Patent No.: US 8,988,279 B2
(45) Date of Patent: Mar. 24, 2015

(54) ANTENNA SIDELOBE REDUCTION USING PHASE ONLY CONTROL

(75) Inventor: Raymond A. Roberge, Stow, MA (US)

(73) Assignee: Raytheon Company, Waltham, MA (US)

( * ) Notice: Subject to any disclaimer, the term of this patent is extended or adjusted under 35 U.S.C. 154(b) by 514 days.

(21) Appl. No.: 13/349,768

(22) Filed: Jan. 13, 2012

(65) Prior Publication Data

US 2013/0181863 A1    Jul. 18, 2013

(51) Int. Cl.
   G01S 13/00    (2006.01)
   G01S 13/44    (2006.01)
   G01S 7/28     (2006.01)
   H01Q 3/26     (2006.01)

(52) U.S. Cl.
   CPC .......... G01S 13/4463 (2013.01); G01S 7/2813 (2013.01); *H01Q 3/2611* (2013.01)
   USPC .............................. 342/159; 342/81; 342/204

(58) Field of Classification Search
   CPC .. G01S 7/2813; G01S 13/4463; H01Q 3/2611
   USPC .............................. 342/74, 81, 159, 204, 379
   See application file for complete search history.

(56) References Cited

U.S. PATENT DOCUMENTS

| 4,489,324 | A  | * | 12/1984 | Blume .......................... 342/372 |
| 4,872,016 | A  | * | 10/1989 | Kress ............................. 342/380 |
| 4,983,982 | A  |   | 1/1991  | Roberge |
| 5,481,270 | A  |   | 1/1996  | Urkowitz et al. |
| 6,384,782 | B2 | * | 5/2002  | Erikmats et al. .............. 342/379 |
| 6,697,009 | B2 | * | 2/2004  | Yu .................................. 342/17 |
| 7,129,888 | B1 | * | 10/2006 | Chesley ........................ 342/159 |
| 7,535,410 | B2 | * | 5/2009  | Suzuki .......................... 342/162 |
| 8,354,960 | B2 | * | 1/2013  | Krich et al. ................... 342/379 |

OTHER PUBLICATIONS

Bucci et al.; Reconfigurable Arrays by Phase-Only Control; IEEE Transactions on Antennas and Propagation; vol. 39; No. 7; Jul. 1991; pp. 919-925.

Povolotsky et al.; Phase Synthesis of Antennas for a Given Radiation Pattern in One Plane Using Piecewise Linear Aperture Phase Distribution; IEEE Transactions on Antennas and Propagation; vol. 47; No. 9; Sep. 1999; pp. 1449-1453.

Dufort; Pattern Synthesis Based on Adaptive Array Theory; IEEE Transactions on Antennas and Propagation; vol. 37; No. 8; Aug. 1989; pp. 1011-1018.

(Continued)

*Primary Examiner* — John B Sotomayor
*Assistant Examiner* — Marcus Windrich
(74) *Attorney, Agent, or Firm* — Burns & Levinson, LLP; Joseph M. Maraia (57) ABSTRACT

A method for reducing sidelobe interference in a radar or communication system. The method includes selecting a desired amplitude weight ($W_D$) to be applied to radar or communication antenna elements and determining phase weights for the radar or communication system elements such that each pair of adjacent, phase weighted elements provides the desired amplitude weight when summed.

18 Claims, 4 Drawing Sheets

(56) References Cited

OTHER PUBLICATIONS

Deford et al.; Mutual Coupling and Sidelobe Tapers in Phase-Only Antenna Synthesis for Linear and Planar Arrays; IEEE Transactions on Antennas and Propagation; vol. 36; No. 11; Nov. 1988; pp. 1624-1629.

Deford et al.; Phase-Only Synthesis of Minimum Peak Sidelobe Patterns for Linear and Planar Arrays; IEEE Transactions on Antennas and Propagation; vol. 36; No. 2; Feb. 1988; pp. 191-201.

* cited by examiner

ANTENNA SIDELOBE REDUCTION USING PHASE ONLY CONTROL

GOVERNMENT SUPPORT

The invention was supported, in whole or in part, by grant W31P4Q-09-G-00001/0002 from the United States Government. The Government has certain rights in the invention.

BACKGROUND

Sidelobes are local maxima of the far field radiation pattern generated by radar and communication system antennas that are not the main lobe of the radiation. The sidelobes typically represent undesirable radiation being directed in undesirable directions. The sidelobe radiation is effectively a waste of system energy and also may cause interference with other equipment. Conventional radar and communication systems typically vary the amplitude of the antenna signals to attempt to attenuate the power produced by the antenna to minimize the sidelobes. The attenuation, however, generates heat and reduces the overall efficiency of the system. A need therefore exists for improved methods and systems for reducing sidelobe interference in radar and communication systems.

SUMMARY

One embodiment is a method for reducing sidelobe interference in a radar or communication system. The method includes selecting a desired amplitude weight ($W_D$) to be applied to radar or communication antenna elements and determining phase weights for the radar or communication system elements such that each pair of adjacent, phase weighted elements provides the desired amplitude weight when summed.

In some embodiments, the method includes controlling phase shifters coupled to the elements to apply the determined phase weights. In some embodiments, the phase weight differential between each pair of adjacent, phase weighted elements in a plane is determined in accordance with:

$$W_\theta = \arccos(2*W_A - 1),$$

where $W_\theta$ is the phase weight differential and $W_A$ is a desired applied weight that is based on the desired amplitude weight ($W_D$).

In some embodiments, the phase weight for an individual element is $$\frac{W_\theta}{2}$$

times an alternating sign of +1 and −1 for adjacent elements. In some embodiments, the desired applied weight ($W_A$) is determined in accordance with:

$$W_A = 1 \text{ if } \frac{W_D}{W_O} > 1,$$

where $W_O$ is equal to any additional weights observed and applied to the elements, and $$W_A = \frac{W_D}{W_O} \text{ if } \frac{W_D}{W_O} \le 1.$$

In some embodiments, the system is a space-fed radar array system and $W_O$ is the system's weighted illumination function. In some embodiments, the elements are arranged in a one-dimensional or two-dimensional pattern.

Another embodiment is a radar or communication system that includes a plurality of radar or communication antenna elements. The system also includes a processor coupled to the plurality of radar or communication antenna elements to apply phase weights to each of the elements, wherein the phase weights are selected such that each pair of adjacent, phase weighted elements provides a desired amplitude weight ($W_D$) to the elements when summed.

In some embodiments, the system includes phase shifters coupled to the elements and the processor, wherein the processor applies the determined phase weights to the phase shifters. In some embodiments, the phase weight differential between each pair of adjacent, phase weighted elements in a plane is determined in accordance with:

$$W_\theta = \arccos(2*W_A - 1),$$

where $W_\theta$ is the phase weight differential and $W_A$ is a desired applied weight that is based on the desired amplitude weight ($W_D$).

In some embodiments, the phase weight for an individual element is $$\frac{W_\theta}{2}$$

times an alternating sign of +1 and −1 for adjacent elements. In some embodiments, the desired applied weight ($W_A$) is determined in accordance with:

$$W_A = 1 \text{ if } \frac{W_D}{W_O} > 1,$$

where $W_O$ is equal to any additional weights observed and applied to the elements, and $$W_A = \frac{W_D}{W_O} \text{ if } \frac{W_D}{W_O} \le 1.$$

In some embodiments, the system is a space-fed radar array system and $W_O$ is the system's weighted illumination function. In some embodiments, the elements are arranged in a one-dimensional or two-dimensional pattern.

Another embodiment is a method for reducing sidelobe interference in a radar or communication system. The method includes selecting a desired amplitude weight function ($W_D$) to be applied to a radar or communication antenna, wherein the antenna surface is divided up into a plurality of discrete locations across the antenna surface. The method also includes determining phase weights to be applied to the discrete locations as ripples in the antenna surface such that each pair of adjacent, phase weighted discrete locations provides the desired amplitude weight function when summed.

In some embodiments, the phase weight differential between each pair of adjacent, phase weighted discrete locations in a plane is determined in accordance with:

$$W_\theta = \arccos(2 * W_A - 1),$$

where $W_\theta$ is the phase weight differential and $W_A$ is a desired applied weight that is based on the desired amplitude weight ($W_D$).

In some embodiments, the phase weight for an individual discrete location is $$\frac{W_\theta}{2}$$

times an alternating sign of +1 and −1 for adjacent discrete locations.

Another embodiment is a radar or communication system. The system includes a radar or communication antenna, wherein the antenna surface is divided up into a plurality of discrete locations across the antenna surface and phase weights are applied to the discrete locations as ripples in the antenna surface such that each pair of adjacent, phase weighted discrete locations provides a desired amplitude weight function ($W_D$) when summed.

In some embodiments, the phase weight differential between each pair of adjacent, phase weighted discrete locations in a plane is determined in accordance with:

$$W_\theta = \arccos(2 * W_A - 1),$$

where $W_\theta$ is the phase weight differential and $W_A$ is a desired applied weight that is based on the desired amplitude weight ($W_D$).

In some embodiments, the phase weight for an individual discrete location is $$\frac{W_\theta}{2}$$

times an alternating sign of +1 and −1 for adjacent discrete locations. In some embodiments, the desired applied weight ($W_A$) is determined in accordance with:

$$W_A = 1 \text{ if } \frac{W_D}{W_O} > 1,$$

where $W_O$ is equal to a specified feed illumination pattern, and $$W_A = \frac{W_D}{W_O} \text{ if } \frac{W_D}{W_O} \leq 1.$$

In some embodiments, the system is a reflector space-fed communication antenna and $W_O$ is the system's illumination function.

The antenna sidelobe reduction methods and systems described herein (hereinafter "technology") can provide one or more of the following advantages. Reducing the sidelobes reduces clutter received using the antenna which expands the region in which targets may be detected. Another advantage is signal to noise is increased for targets. Another advantage is that radar antennas can be deployed closer together because the sidelobes are reduced. Another advantage is that the antenna apertures do not heat up due to amplitude attenuation, which is a typical method currently employed to reduce sidelobes.

Other aspects and advantages of the current invention will become apparent from the following detailed description, taken in conjunction with the accompanying drawings, illustrating the principles of the invention by way of example only.

BRIEF DESCRIPTION OF THE DRAWINGS

The foregoing features of various embodiments of the invention will be more readily understood by reference to the following detailed descriptions in the accompanying drawings, in which.

DETAILED DESCRIPTION OF ILLUSTRATIVE EMBODIMENTS

Embodiments disclosed herein reduce antenna sidelobes using only phase control in the antenna aperture. The cancellation effect of two adjacent antenna aperture areas or antenna elements effectively creates the desired amplitude weighting on the antenna aperture. Embodiments disclosed provide a cost effective alternative to amplitude weighting of an aperture. Embodiments described herein reduce antenna sidelobes (transmit and/or receive sidelobes) which reduces the signal clutter received, expand the region over which targets can be detected, and increase the signal-to-noise for signals associated with targets. Reducing the sidelobes reduces antenna signal interference. Reducing the antenna sidelobes allows for antennas to be deployed closer together in distributed clutter regions.

Figure 1:
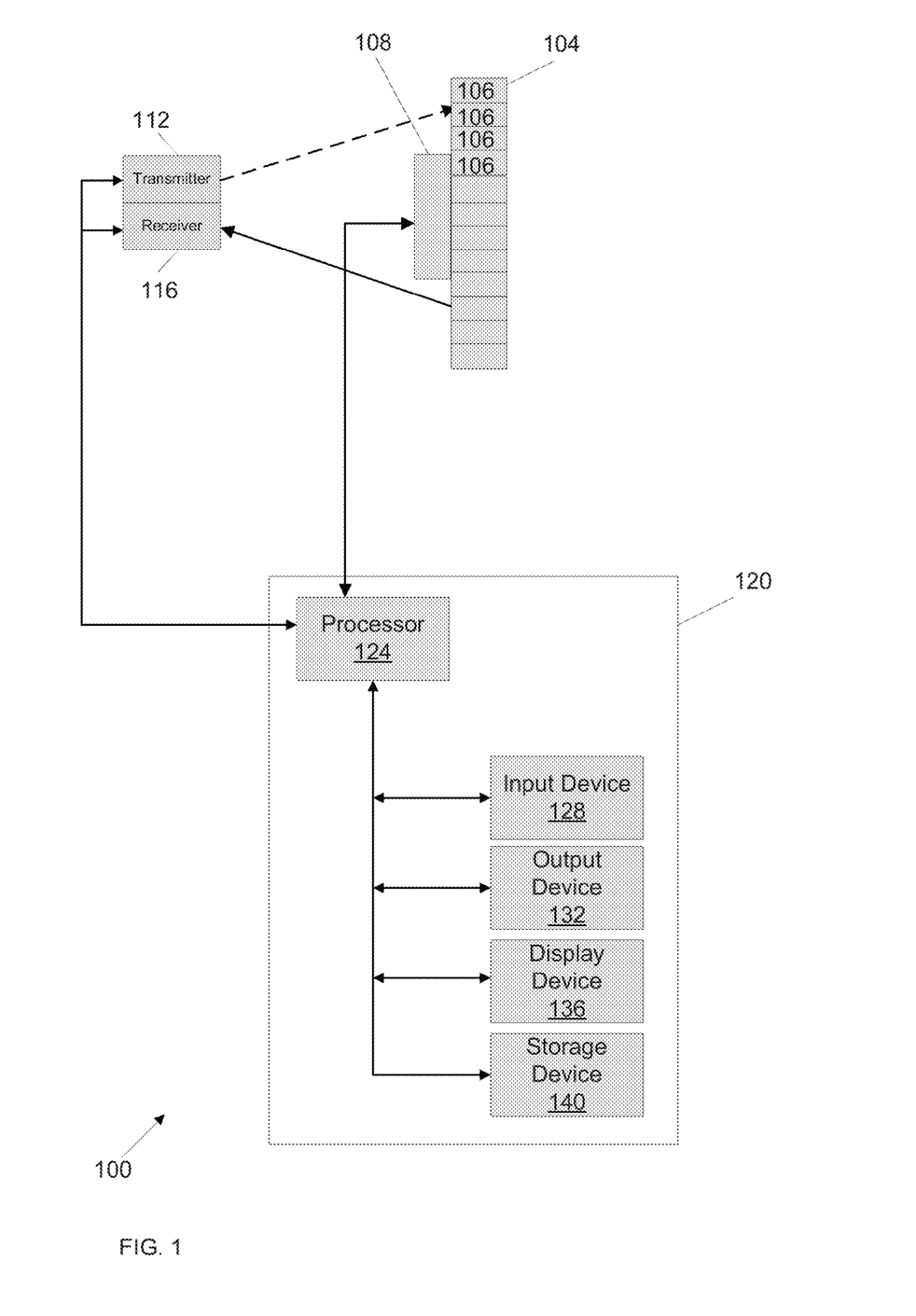
FIG. 1 is a schematic illustration of a system for reducing sidelobe interference, according to an illustrative embodiment.

FIG. 1 is a schematic illustration of a system 100 for reducing sidelobe interference, according to an illustrative embodiment. The system 100 includes an antenna 104 (e.g., radar or communication antenna) that includes a plurality of antenna elements 106. The antenna elements 106 are arranged in a one dimensional pattern. In some embodiments, the antenna elements 106 are arranged in a two-dimensional pattern. The system 100 also includes phase shifters 108 coupled to the antenna elements 106 to control the relative phase of the antenna elements 106 is accordance with, for example, the method of FIG. 2 described herein. Exemplary phase shifters 108 include switched line phase shifters, switched filter phase shifters, or continuously variable analog or digital phase shifters. The system 100 also includes an antenna system controller 120 that includes a processor 124, an input device 128, an output device 132, a display device 136, and a storage device 140.

The processor 124 is coupled to the phase shifters 108. The processor 124 applies phase weights to the phase shifters 108 which in turn applies the phase weights to the plurality of antenna elements 106. The processor 124 is also coupled to the transmitter 112 to provide transmission signals to the antenna elements 106. The processor 124 is also coupled to the receiver 116 to receive signals (e.g., radar or communication signals) acquired by the antenna 104.

The modules and devices described herein can, for example, utilize the processor 124 to execute computer executable instructions and/or include a processor to execute computer executable instructions (e.g., an encryption processing unit, a field programmable gate array processing unit, etc.). It should be understood that the system 100 can include, for example, other modules, devices, and/or processors known in the art and/or varieties of the illustrated modules, devices, and/or processors.

The input device 128 receives information associated with the system 100 (e.g., instructions from a user, instructions from another computing device) from a user (not shown) and/or another computing system (not shown). The input device 128 can include, for example, a keyboard or a scanner. The output device outputs information associated with the system 100 (e.g., information to a printer (not shown), information to an audio speaker (not shown)). The display device 136 displays information associated with the system 100 (e.g., target information). The storage device 140 can store information and/or any other data associated with the system 100. The storage device 140 can include a plurality of storage devices. The storage devices can include, for example, long-term storage (e.g., a hard drive, a tape storage device, flash memory, etc.), short-term storage (e.g., a random access memory, a graphics memory, etc.), and/or any other type of computer readable storage. The processor 124 executes the operating system and/or any other computer executable instructions for the system 100. In some embodiments, the operating system and/or other executable instructions are executed on one or more processors.

Figure 2:
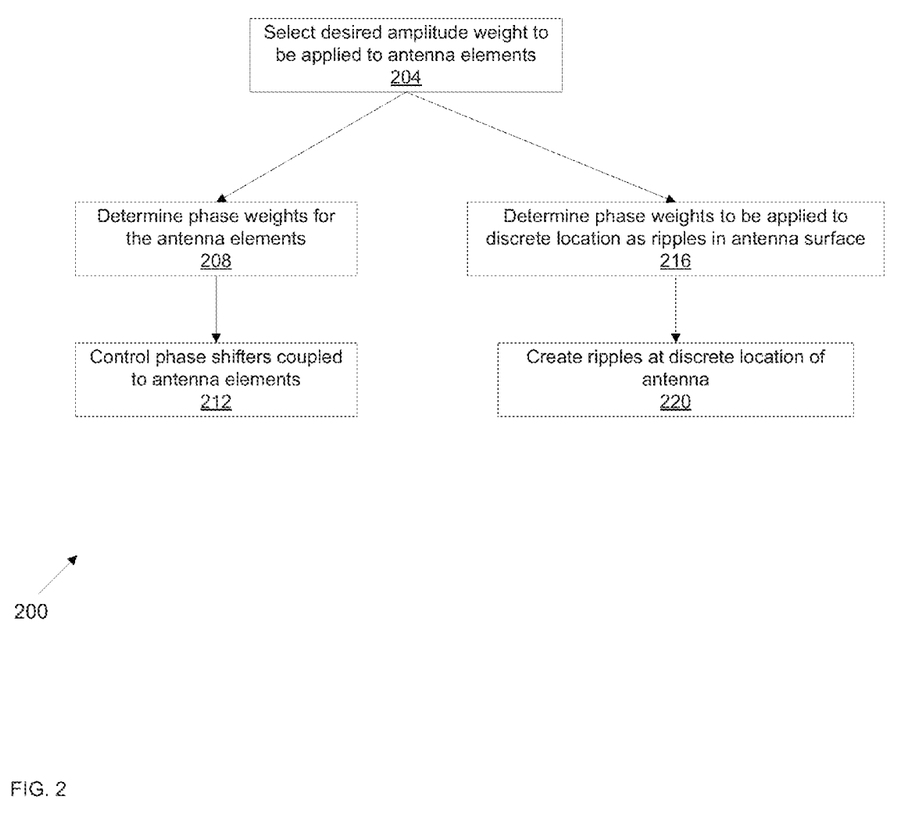
FIG. 2 is a flowchart of a method for reducing sidelobe interference in a radar or communication system, according to an illustrative embodiment.

FIG. 2 is a flowchart 200 of a method for reducing sidelobe interference in a radar or communication system, according to an illustrative embodiment. The method includes selecting 204 a desired amplitude weight ($W_D$) to be applied to antenna elements of a radar or communication system (e.g., antenna elements 106 of the antenna 104 of FIG. 1). Exemplary weighting functions that may be used include Dolph, Taylor or Hamming weighting functions. The amplitude of the weighting function (e.g., 50 dB, 60 dB) is selected depending on the specific application.

The method also includes determining phase weights 208 for the antenna elements such that each pair of adjacent, phase weighted antenna elements provides the desired amplitude weight when summed. In one embodiment, the phase weight differential between each pair of adjacent, phase weighted elements in a plane of the antenna is determined in accordance with:

$$W_\theta = \arccos(2 * W_A - 1), \quad \text{EQN. 1}$$

where $W_\theta$ is the phase weight differential and $W_A$ is a desired applied weight that is based on the desired amplitude weight ($W_D$). The phase weight for an individual element is $$\frac{W_\theta}{2}$$

times an alternating sign of +1 and −1 for adjacent elements. In some embodiments, the desired applied weight ($W_A$) is determined in accordance with:

$$W_A = 1 \text{ if } \frac{W_D}{W_O} > 1 \quad \text{EQN. 2}$$

where $W_O$ is equal to any additional weights observed and applied to the elements, and $$W_A = \frac{W_D}{W_O} \text{ if } \frac{W_D}{W_O} \leq 1 \quad \text{EQN. 3}$$

$W_O$ is equal to any additional weights observed and applied to the elements. For example, $W_O$ is the weighted illumination function used in illuminating the array antenna in a space-fed radar array system.

The method also includes controlling the phase shifters 212 coupled to the antenna elements to apply the determined phase weights. Radar transmission signals and receive signals for the antenna then have reduced sidelobes as a result of applying the phase weights to the antenna elements.

In an alternative embodiment, instead of applying the phase weights to the antenna elements in accordance with steps 208 and 212, the method instead involves determining phase weights 216 to be applied to discrete locations as ripples in the antenna surface such that each pair of adjacent, phase weighted discrete locations provides the desired amplitude weight function when summed. The phase weights are determined similarly in accordance with EQNS. 1-3. The ripples are created by displacing the surface in a direction perpendicular to the surface at each discrete location (e.g., as described with respect to FIG. 3). The surface ripple depth is determined by first calculating the wavelength of the desired center frequency (Wavelength=C/f where C is the speed of light divided by the center frequency). Each wavelength is 360 degrees. For example, a 90 degree ripple would be a depth of the wavelength divided by 4. The method also includes creating ripples in the antenna surface 220 at the discrete locations (e.g., by commanding an actuator to displace the discrete location from a nominal position or using fixed ripples for a fixed beam antenna).

Figure 3:
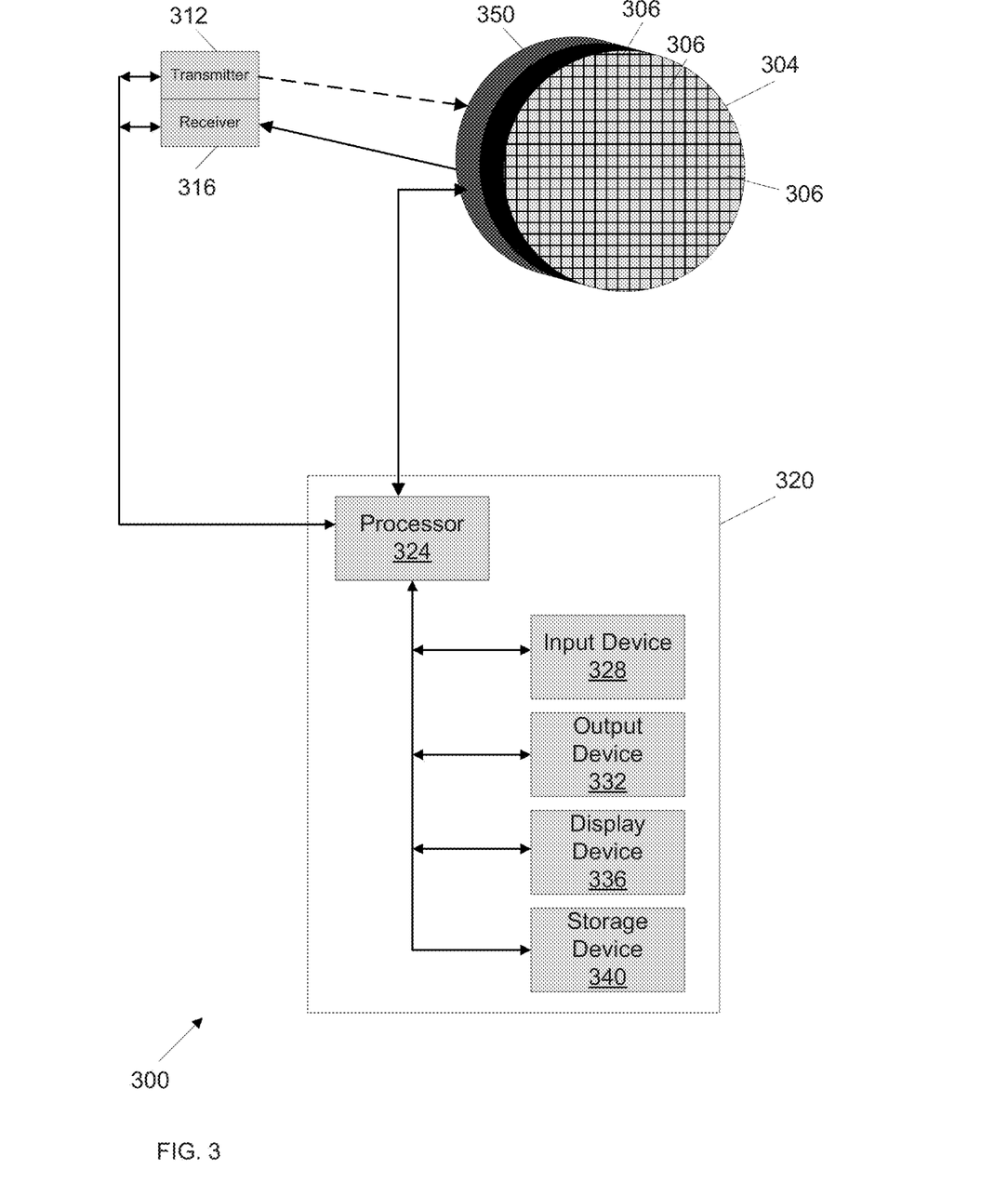
FIG. 3 is a schematic illustration of a system for reducing sidelobe interference, according to another illustrative embodiment.

FIG. 3 is a schematic illustration of a system 300 for reducing sidelobe interference, according to another illustrative embodiment. The system 300 includes an antenna 304 (e.g., radar or communication antenna). The antenna 304 surface is divided up into a plurality of discrete locations 306 across the antenna 304 surface. The antenna 304 includes an actuator assembly 350 (e.g., an assembly that includes one linear actuator for each of the plurality of discrete locations) that controls the position of each of the plurality of discrete locations. The actuator assembly 350 is configured to vary the position of the discrete locations to create ripples in the surface of the antenna 304. By varying the position of a discrete location on the surface of the antenna 304, the system 300 controls the phase of radar signals transmitted and received by the antenna 304.

The system 300 also includes an antenna system controller 320 that includes a processor 324, an input device 328, an output device 332, a display device 336, and a storage device 340. The processor 324 is coupled to a transmitter 312 and receiver 316. The transmitter 312 and receiver 316 are coupled to the antenna 304. The processor 324 provides antenna transmission signals to the transmitter 312. The transmitter 312 provides the transmission signals to the antenna 304 to transmit. The processor 324 receives signals (e.g., radar or communication signals) from the receiver 316 that are acquired by the antenna 304. The processor 324 is also coupled to the actuator assembly 350 and provides signals to the actuator assembly 350 to vary the position of the discrete locations 306 in accordance with, for example, steps 216 and 220 of the method of FIG. 2.

Figure 4:
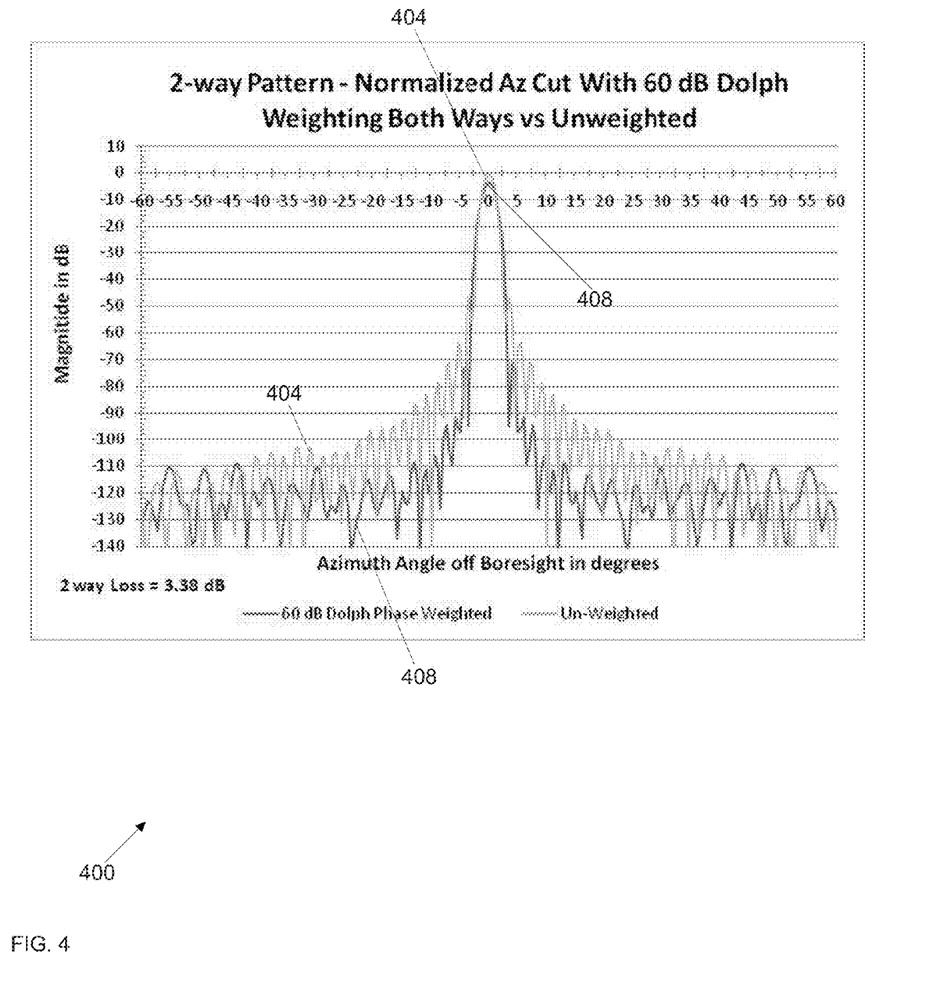
FIG. 4 is a plot of the antenna pattern magnitude perpendicular to the antenna array face versus the azimuth angle off the boresight of the antenna in degrees.

FIG. 4 is a plot 400 of the antenna pattern magnitude (Y-Axis) perpendicular to the antenna array face versus the azimuth angle off the boresight of the antenna array in degrees (X-Axis). Curve 408 is a plot of the magnitude for a phase-weighted (approximately 60 dB Dolph) magnitude antenna using a system incorporating the technology described herein. Curve 404 is the plot of the magnitude for an un-weighted antenna.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

The invention claimed is:

1. A method for reducing sidelobe interference in a radar or communication system, the method comprising:
    selecting, by one or more processors, a desired amplitude weight ($W_D$) to be applied to radar or communication antenna elements; and
    determining, by the one or more processors, phase weights for the radar or communication system elements such that each pair of adjacent, phase weighted elements provides the desired amplitude weight when summed,
    wherein the phase weight differential between each pair of adjacent, phase weighted elements in a plane is determined in accordance with:

$$W_\theta = \arccos(2 * W_A - 1)$$

where $W_\theta$ is the phase weight differential and $W_A$ is a desired applied weight that is based on the desired amplitude weight ($W_D$).

2. The method of claim 1, comprising controlling phase shifters coupled to the elements to apply the determined phase weights.

3. The method of claim 1, wherein the phase weight for an individual element is $$\frac{W_\theta}{2}$$

times an alternating sign of +1 and −1 for adjacent elements.

4. The method of claim 1, wherein the desired applied weight ($W_A$) is determined in accordance with:

$$W_A = 1 \text{ if } \frac{W_D}{W_O} > 1,$$

where $W_O$ is equal to any additional weights observed and applied to the elements, and $$W_A = \frac{W_D}{W_O} \text{ if } \frac{W_D}{W_O} \leq 1.$$

5. The method of claim 3, wherein the system is a space-fed radar array system and $W_O$ is the system's weighted illumination function.

6. The method of claim 1, wherein the elements are arranged in a one-dimensional or two-dimensional pattern.

7. A radar or communication system, the system comprising:
    a plurality of radar or communication antenna elements; and
    a processor coupled to the plurality of radar or communication antenna elements to apply phase weights to each of the elements, wherein the phase weights are selected such that each pair of adjacent, phase weighted elements provides a desired amplitude weight ($W_D$) to the elements when summed,
    wherein the phase weight differential between each pair of adjacent, phase weighted elements in a plane is determined in accordance with:

$$W_\theta = \arccos(2 * W_A - 1)$$

where $W_\theta$ is the phase weight differential and $W_A$ is a desired applied weight that is based on the desired amplitude weight ($W_D$).

8. The system of claim 7, comprising phase shifters coupled to the elements and the processor, wherein the processor applies the determined phase weights to the phase shifters.

9. The method of claim 7, wherein the phase weight for an individual element is $$\frac{W_\theta}{2}$$

times an alternating sign of +1 and −1 for adjacent elements.

10. The method of claim 7, wherein the desired applied weight ($W_A$) is determined in accordance with:

$$W_A = 1 \text{ if } \frac{W_D}{W_O} > 1,$$

where $W_O$ is equal to any additional weights observed and applied to the elements, and $$W_A = \frac{W_D}{W_O} \text{ if } \frac{W_D}{W_O} \leq 1.$$

11. The method of claim 7, wherein the system is a space-fed radar array system and $W_O$ is the system's weighted illumination function.

12. The system of claim 7, wherein the elements are arranged in a one-dimensional or two-dimensional pattern.

13. A method for reducing sidelobe interference in a radar or communication system, the method comprising:
    selecting, by one or more processors, a desired amplitude weight function ($W_D$) to be applied to a radar or communication antenna, wherein the antenna surface is divided up into a plurality of discrete locations across the antenna surface; and determining, by the one or more processors, phase weights to be applied to the discrete locations as ripples in the antenna surface such that each pair of adjacent, phase weighted discrete locations provides the desired amplitude weight function when summed, wherein the phase weight differential between each pair of adjacent, phase weighted discrete locations in a plane is determined in accordance with:

$$W_\theta = \arccos(2*W_A - 1)$$

where $W_\theta$ is the phase weight differential and $W_A$ is a desired applied weight that is based on the desired amplitude weight ($W_D$).

14. The method of claim 13, wherein the phase weight for an individual discrete location is $$\frac{W_\theta}{2}$$

times an alternating sign of +1 and −1 for adjacent discrete locations.

15. A radar or communication system, the system comprising:

a radar or communication antenna, wherein the antenna surface is divided up into a plurality of discrete locations across the antenna surface and phase weights are applied to the discrete locations as ripples in the antenna surface such that each pair of adjacent, phase weighted discrete locations provides a desired amplitude weight function ($W_D$) when summed, wherein an actuator assembly creates the ripples in the antenna surface, wherein the phase weight differential between each pair of adjacent, phase weighted discrete locations in a plane is determined in accordance with:

$$W_\theta = \arccos(2*W_A - 1)$$

where $W_\theta$ is the phase weight differential and $W_A$ is a desired applied weight that is based on the desired amplitude weight ($W_D$).

16. The system of claim 15, wherein the phase weight for an individual discrete location is $$\frac{W_\theta}{2}$$

times an alternating sign of +1 and −1 for adjacent discrete locations.

17. The system of claim 15, wherein the desired applied weight ($W_A$) is determined in accordance with:

$$W_A = 1 \text{ if } \frac{W_D}{W_O} > 1,$$

where $W_O$ is equal to a specified feed illumination pattern, and $$W_A = \frac{W_D}{W_O} \text{ if } \frac{W_D}{W_O} \leq 1.$$

18. The system of claim 17, wherein the system is a reflector space-fed communication antenna and $W_O$ is the system's illumination function.

* * * * *